(12) United States Patent
Morris et al.

(10) Patent No.: US 6,246,045 B1
(45) Date of Patent: Jun. 12, 2001

(54) REFLECTED RADIANCE SENSORS FOR DETECTION OF REFLECTED RADIATION

(75) Inventors: Henry B. Morris; Arvi D. Jeffery, both of Mesa, AZ (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 09/150,361

(22) Filed: Sep. 9, 1998

(51) Int. Cl.[7] ........................................... G01J 1/42
(52) U.S. Cl. ........................... 250/216; 250/239; 356/218
(58) Field of Search ........................ 250/237 R, 239, 250/216, 214 R, 208.2, 338.1, 339.11; 356/213, 214, 215, 216, 217, 218, 219, 220, 221, 222, 223, 224, 225, 226, 227, 228, 402, 405, 406

(56) References Cited

U.S. PATENT DOCUMENTS

| | | | |
|---|---|---|---|
| 2,930,281 | * 3/1960 | Dunn | 356/221 |
| 2,964,636 | 12/1960 | Cary . | |
| 3,629,585 | 12/1971 | Desvignes et al. . | |
| 3,734,630 | * 5/1973 | McIntosh et al. | 356/218 |
| 4,111,561 | * 9/1978 | Plummer | 356/225 |
| 4,153,368 | * 5/1979 | Falbel et al. | 356/225 |
| 4,636,631 | 1/1987 | Carpentier et al. . | |
| 4,974,552 | 12/1990 | Sickafus . | |
| 5,185,637 | * 2/1993 | Lewin et al. | 356/218 |
| 5,272,518 | * 12/1993 | Vincent | 356/405 |
| 5,298,752 | 3/1994 | Wight . | |
| 5,308,985 | 5/1994 | Lee . | |
| 5,326,173 | * 7/1994 | Evans | 374/128 |
| 5,545,896 | 8/1996 | Bratt et al. . | |
| 5,633,498 | 5/1997 | Savicki . | |

* cited by examiner

Primary Examiner—John R. Lee
(74) Attorney, Agent, or Firm—Alston & Bird LLP

(57) ABSTRACT

A reflected radiance sensor is held in a spaced-apart relationship with a surface so the field of view of the sensor intersects the surface so that the radiation reflected off the surface can be detected and measured. The sensor is configured to detect only reflected radiation so that the reflected radiation is accurately measured without any direct incident component. A support structure is utilized to hold the detector of the sensor in place. The support structure is preferably made of material that is substantially invisible (i.e., transparent) to the radiation wavelength band of interest. The design of a support structure in accordance with the present invention is not limited to any one design, but may be designed for optimum performance in a particular application.

21 Claims, 11 Drawing Sheets

REFLECTED RADIANCE SENSORS FOR DETECTION OF REFLECTED RADIATION

FIELD OF THE INVENTION

The present invention generally relates to radiation sensors, and more particularly, to radiation sensors that detect and measure surface reflected radiation.

BACKGROUND OF THE INVENTION

Radiation sensors provide a wide variety of functionality in both military and commercial applications. For example, radiation sensors are utilized in communication systems, in lighting control systems, and in imaging systems, just to name a few. In many applications, the radiation sensor is mounted to a surface so that the angular field of view (FOV) of the sensor does not intersect the surface, that is, the sensor is configured to detect radiation incident on the surface to which the sensor is mounted. The sensor is typically configured so that its FOV is directed into open space for the detection of incident radiation, without reflection off the surface to which the sensor is mounted. Examples of such sensors can be found in one or more of U.S. Pat. Nos. 2,964,636, 4,636,631, and 5,308,985.

Nonetheless, it may be desirable in many applications to detect and measure radiation reflected off a surface to, for instance, control the reflected radiation intensity (radiance) or characterize the reflectivity of the surface. For example, in a radiant heating system where reflective surfaces are utilized to redirect the radiant heat flux it may be desirable to precisely monitor the intensity of the radiation reflected at several points on the surfaces. Monitoring the intensity of the reflected radiation or changes in reflectivity may be important in order to accurately establish and control radiant intensity or uniformity, or to establish and maintain a desired spatial intensity pattern. It may also be desirable to monitor the degradation in the reflectivity of the reflective surfaces over time, especially where the cumulative effect may be significant. This would be possible using a known incident radiant intensity and a calibrated reflected radiance sensor.

As another example, it may be desirable to precisely control the intensity (luminance) reflected off of surfaces in lighting systems used in a factory, office, aircraft, etc. The reflectivity of surfaces degrade through exposure to the elements of nature and normal use, which may decrease their ability to effectively reflect light onto the subject of interest. In addition, the intensity of the light source may change over time, and thus causing a reduction in reflected luminance. Source intensity degradation also applies to radiant heating systems. By monitoring the reflected radiance or luminance, the source intensity can be precisely controlled to compensate for source intensity changes and surface reflectance changes. These are just two examples of the many circumstances in which it may be desirable to measure the radiance or luminance reflected off a surface, and it will be appreciated by those of ordinary skill in the art that numerous other circumstances exist in which it would be desirable to measure reflected radiation.

However, in order to detect the radiation reflected off a surface, a probe or other means is typically utilized to position the sensor over the surface so the FOV of the sensor is directed toward the general area of interest of the surface. However, the probe or other means used to position the sensor may interfere with or possibly block a portion of the incident radiation. Moreover, the reflected radiation incident on the sensor may be redirected toward the surface in a manner that produces multiple reflections before reaching the sensor, which may cause inconclusive sensor readings. The probe may also not be capable of being precisely and consistently positioned over the surface so as to render conclusive measurements. Thus, the amount of radiation reflected off the surface may not be accurately measured, and therefore, may be irrelevant. Usually, reflected radiation is remotely measured with radiometer instruments, which are expensive, bulky, and can block some of the incident radiation. Furthermore, they are not integrated with the surface so that they may be operated continuously for uninterrupted monitoring which advantageous in critical control situations.

Therefore, an unsatisfied need exists in the industry for a sensor for accurately and consistently measuring the radiation reflected off a surface.

SUMMARY OF THE INVENTION

It is an object of the present invention to provide an improved radiation sensor.

It is another object of the present invention to provide an improved radiation sensor for measuring the radiation reflected off the surface to which the sensor is mounted.

It is another object of the present invention to provide an efficient surface mounted radiation sensor.

These and other objects are provided according to the present invention by a reflected radiance (i.e., luminance) sensor that is held in a spaced-apart relationship with a surface which intersects the field of view of the sensor so that the radiation reflected off the surface can be measured. The sensor is configured to detect only reflected radiation so that the reflected radiation is accurately measured without any direct incident component. A support structure is utilized to hold the sensor in place. The support structure is preferably made of material that is substantially invisible (i.e., transparent) to the radiation wavelength band of interest. The design of the support structure in accordance with the present invention is not limited to any one design, but may be designed for optimum performance in a particular application. For instance, a support structure may be contoured to the surface to which the sensor is mounted in order to reduce air resistance or disturbances along the surface where such disturbances may be undesirable. Advantageously, the reflected radiance sensor of the present invention is able to provide measurement data on a real-time or periodic basis without having to use a probe or other intrusive means which may affect the accuracy of the measured reflected radiation. Further, the reflected radiance sensor of the present invention is mounted to the surface so it is at a known, predetermined distance from the surface which renders consistent measurements.

In accordance with an aspect of the present invention, a sensor that measures the intensity of radiation reflected off a surface comprises a radiation detector and a support structure for positioning the radiation detector in a spaced-apart relationship with respect to the surface to which the sensor is mounted, so that the field of view of the radiation detector intercepts the surface. This support structure may take a frusto-conical shape, though it will be appreciated by those of ordinary skill in the art, that the support structure may take other suitable shapes. The reflected radiance sensor may further include a lens which is optically coupled to the radiation detector. In one embodiment, the lens may comprise an immersion lens that may be attached to the radiation detector using an optical adhesive.

The support structure may define a cylindrical cavity, wherein the lens is disposed in the cavity adjacent to the radiation detector. The lens may take any number of shapes, such as hemispherical, quasi-hemispherical, cylindrical, or half-cylindrical. Preferably, the lens comprises a material having a refractive index greater than 1.25. The radiation detector may be positioned at a focal point of the lens in order that a smaller diameter detector may be utilized. Further, the lens preferably includes means of preventing direct radiation from being incident on the radiation detector. The means for preventing direct light incidence on the detector may take many forms, such as a black mask at the apex of the lens, or a planar surface at the bottom of the lens opposite the radiation detector.

Nonetheless, regardless of whether or not a lens is utilized, the radiation detector is disposed in a position by the support structure that essentially prevents direct incident radiation from being detected by the radiation detector. Thus, the radiation detected by the radiation detector is radiation reflected off the surface, with no direct incident radiation component. Depending upon numerous factors, such as the particular application of the surface luminance sensor, the radiation detector utilized, or the lens utilized, it may be desirable to utilize a sensor array of two or more sensors attached to and held in place by the support structure.

The radiation detector that may be utilized in the present invention can be selected based upon the radiation wavelength of interest and the minimum level of reflected radiance that must be measured in a particular application. The wavelengths of interest may be in the ultra-violet, visible, near-infrared, thermal infrared, and millimeter wave bands of the electromagnetic spectrum. For instance, the radiation detector may be a photodiode, a photo-voltaic detector, a photo-conductor (photo-resistor), a thermistor, a thermopile, a bolometer, a micro-bolometer, a pyroelectric detector, a charge injection device (CID), a photo-capacitor, a metal-insulator semiconductor (MIS) detector, a transparent electrode Schottky photodiode, a platinum silicide or irridium silicide Schottky diode infrared detector, or a charge coupled device (CCD). If an array of sensors is utilized in connection with the present invention, one or more radiation detectors of different wavelength sensitivity and/or construction may be utilized.

The support structure is preferably substantially transparent to the radiation wavelength of interest, as defined by the spectral sensitivity of the radiation detector. Further, the support structure may comprise a lens that is optically coupled to the radiation detector and mounted directly to the surface. Alternatively, the radiation detector may be encased in the metal package having a window for receiving radiation therethrough. The metal package may be spaced from the surface by mechanical means such as one or more posts or other suitable support structure.

The support structure may include one or more channels for receiving electrical leads required to operate the radiation detector. The electrical leads may be for providing power and/or transmitting signal and control data between the radiation detector and associated control and signal processing circuitry. The channel may be a groove on an exterior surface or the interior surface of the support structure, or alternatively, a bore through the support structure.

In accordance with another aspect of the present invention, a reflected radiance sensor that measures the intensity of radiation reflected off a surface comprises a radiation detector and a lens optically coupled to the radiation detector, wherein the lens is mounted to the surface and positions the radiation detector in a spaced-apart relationship with respect to the surface so that the field of view of the radiation detector intersects the surface.

Thus, a reflected radiance sensor in accordance with the present invention is capable of measuring the reflected radiance (luminance) off the surface to which the sensor is mounted. The reflected radiance sensor of the present invention will only detect reflected radiation and not direct incident radiation so that the measurements are accurate and consistent. The design of the support structure is flexible, and can be customized to the application of the sensor, the radiation detector utilized, the lens (if any) utilized, etc. for optimized performance.

Other features and advantages of the present invention will become apparent to one that is skilled in the art upon examination of the following drawings and detailed description. It is intended that all such additional features and advantages be included herein within the scope of the present invention, as defined in the appended claims.

DETAILED DESCRIPTION OF THE PREFERRED EMBODIMENTS

I. Introduction

Figure 1:
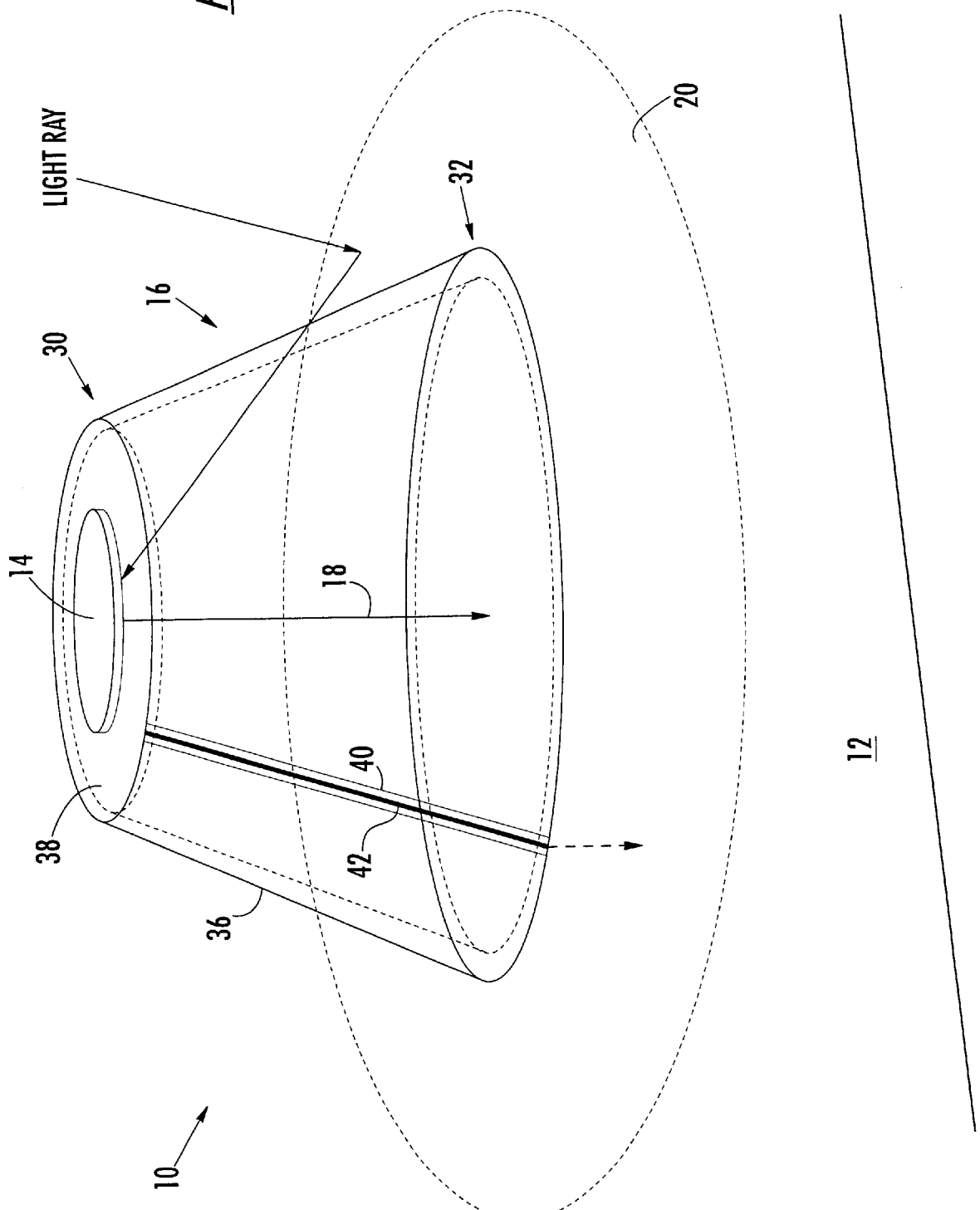
FIG. 1 is a perspective view of a reflected radiance sensor in accordance with a first embodiment of the present invention.

The present invention will now be described more fully hereafter with reference to the accompanying drawings, in which preferred embodiments of the invention are shown. This invention may, however, be embodied in many different forms and should not be construed as limited to the embodiments set forth herein. Rather, these embodiments are provided so that the disclosure will be thorough and complete, and will fully convey the scope of the invention to those skilled in the art. In the drawings, the elements are not necessarily drawn to scale. Furthermore, like reference numerals refer to like elements throughout.

The following description is of the best contemplating modes of carrying out the present invention. The structures of the present invention have practical application in measuring the reflected radiation off a surface. However, the particular application of the present invention as described herein is directed to measuring the radiation reflected off a surface to which the sensor is mounted. Thus, the scope of the present invention should not be limited to that described hereinafter, but should be determined by referencing the appended claims.

II. Surface Mounted Reflected Radiance Sensors

With reference to FIG. 1, a reflected radiance sensor 10 in accordance with the present invention is illustrated. The reflected radiance sensor 10 is designed to detect reflected radiation off surface 12. In accordance with a feature of the present invention, the reflected radiance sensor 10 is designed not to detect radiation that is directly incident the surface luminance sensor 10, but to detect only reflected radiation off the surface. Therefore, the reflected radiance sensor 10 can accurately measure the radiance (or luminance) reflected off the surface 12 for illumination control where it is desirable either to establish and maintain uniformity through a closed-loop feedback control or to establish and maintain a desired spatial intensity pattern.

To that end, the reflected radiance sensor 10 comprises a radiation detector element 14 positioned in a spaced-apart relationship with surface 12 by a support structure 16. Accordingly, the detector element 14 is positioned a distance 18 from the surface 12. A detection region 20 defines the area of the surface 12 to which the surface luminance sensor 10 is sensitive to reflected radiation therefrom. The size and geometry of the detection region 20 is controlled by several factors such as the distance 18 and the angular field of view (FOV) of the detector element 14. In general, by increasing one of either the distance 18 or the FOV of the detector element 14, the detection region is increased. It may be desirable in certain applications to increase the detection region 20 in order to obtain a greater spatial sampling that more accurately represents the radiation reflected off surface 12. However, increases in the distance 18 will increase the profile of the surface luminance sensor 10, and thus, the more obtrusive and/or obstructive the surface radiance sensor 10 may be.

The detector element 14 preferably has a defined wavelength band of photosensitivity. For example, a silicon carbide (SiC) photodiode may be utilized to detect radiation in the ultraviolet wavelength band, whereas a silicon (Si) photodiode may be used to detect radiation in the visible and near-infrared wavelength bands as experimentally demonstrated by the present inventors. Surface radiance sensors utilizing uncooled infrared detectors such as a vanadium dioxide ($VO_x$) micro-bolometer or a thin-film thermopile may be utilized to measure reflected 3–5 $\mu$m and 8–12 $\mu$m infrared radiation as experimentally demonstrated by the present inventors. Accordingly, the detector element 14 may comprise any suitable radiation detector having a sensitivity to a wavelength band of interest, and having a finite angular field of view. The detector element may comprise a photodetector such as one of the following: photodiode, photovoltaic detector, photo-conductor, thermistor, thermopile, bolometer, micro-bolometer, pyroelectic detector, charge injection device (CID), photo-capacitor, a metal-insulator semiconductor (MIS) detector, a transparent electrode Schottky photodiode, a platinum silicide or irridium silicide Schottky diode infrared detector. If desired, imaging detector arrays such as charge injection devices (CID), metal-insulator semiconductors, focal planes arrays, and charge coupled devices (CCD) may be utilized in accordance with the present invention. Further, the surface luminance sensor 10 may be based on micro-antenna arrays that are sensitive to millimeter or microwaves. The structure and operation of the above detection elements are well known to one of ordinary skill in the art, and therefore, require no further discussion herein. More detailed discussions of the numerous types of detector elements which may be suitable for implementation in the reflected radiance sensor of the present invention can be found in several text books such as Richard D. Hudson, Jr., "Infrared System Engineering," John Wiley & Sons, Inc. (1969), and Eustace L. Dereniak and Devonne G. Crowe, "Optical Radiation Detectors," John Wiley & Sons, Inc. (1984).

The detector element 14 may be attached to the support structure 16 utilizing a suitable adhesive such as epoxy. Alternatively, the support structure 16 may be configured to receive the detector element 14 and mechanically hold the detector element 14 in place. For instance, the support structure may include a recess or aperture sized and shaped to receive and retain the detector element 14 using friction against the side-walls of the detector element 14. Alternatively, the detector element 14 may be integrally formed in the support structure 16 using microelectronic fabrication techniques.

The support structure 16 is configured to position the detector element 14 in a space-apart relationship with respect to surface 12 so that the detector element 14 detects only radiation reflected off surface 12. The support structure 16 may take many shapes, a few of which are provided herein as exemplary embodiments. For instance, in FIG. 1, the support structure 16 takes a frusto-conical shape with a double-skirted construction. The detector element 14 is attached to the small diameter end 30 at a distance 18 from the surface 12, and the support structure 16 is attached to the surface 12 at the large diameter end 32. The support structure is preferably attached to the surface 12 utilizing an adhesive, such as those discussed herein before. The frusto-conical shape of support structure 16 provides a pseudo-conformal profile with respect to surface 12 so as to minimize mechanical obstruction and/or optical disturbances, as may be desired in order to minimize sensor breakage and erroneous sensor data.

The support structure 16 may be a solid structure, or as illustrated in FIG. 1, may have an internal cavity 34 defined by a cylindrical wall 36 and an end piece 38 at the small diameter end 30. Regardless of whether the support structure 16 is solid or has an interior cavity, the material comprising support structure 16 should be substantially transparent to the wavelength band to which the detector element 14 is sensitive in order to reduce loss in the radiation reaching the detector element.

A channel 40 is provided in the cylindrical sidewall 36 of the support structure 16 to receive one or more electrical leads 42 associated with the detector element 14. The electrical leads 42 connected the detector element 14 to control and signal processing circuitry such as amplifiers and other electronic devices which control the operation of the detector element 14. It is noted that the detector element 14 and all or part of the control and signal processing circuitry, such as the signal amplifier, may comprise a integrated microelectronic device. The channel 40 may comprise a machined groove in the exterior surface or the interior surface of the cylindrical sidewall 36, or alternatively, may include a bore through the cylindrical sidewall 36. While the groove may be easier to fabricate in the sidewall 36, a bore provides a more esthetic and environmentally insulated embodiment. Four key considerations in selecting material for the support struture are transparency in the optical band(s) of intrerest, thermo-mechanical properties, raw material cost, and support structure fabrication cost. In the preferred embodiment, the support structure 16 comprises an extruded frusto-conical cyclinder of acrylic plastic such as Lucite, which is transparent in the visible and near-infrared bands. For the critical 3–5 $\mu$m band, diamond machined sapphire support structure may be used. For both the 3–5 $\mu$m and equally critical 8–12 $\mu$m infrared band, chemical vapor deposited or diamond machined zinc sulfide (ZnS) or zinc selenide (ZnSe) support structures may be utilized. Diamond machined germanium support structures may also be used in both infrared bands.

Figure 2:
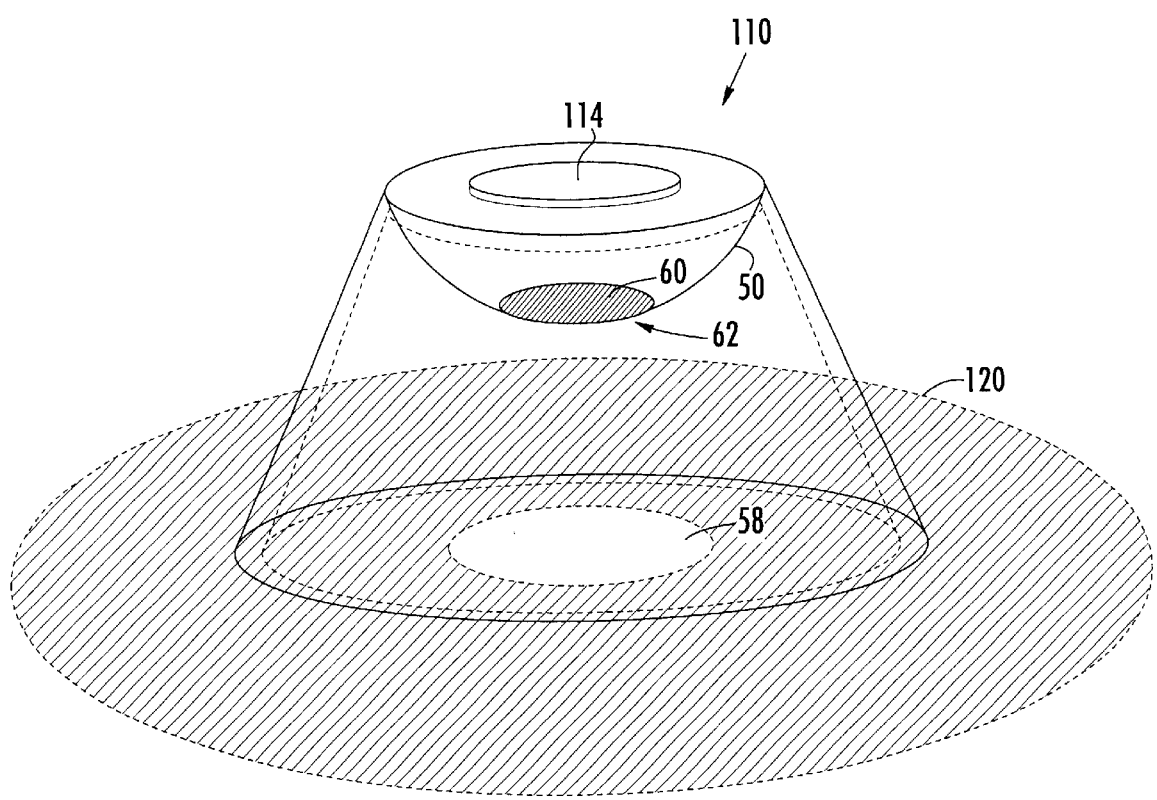
FIG. 2 is a perspective view of a reflected radiance sensor in accordance with a second embodiment of the present invention wherein a lens is optically coupled to the detector.
Figure 3:
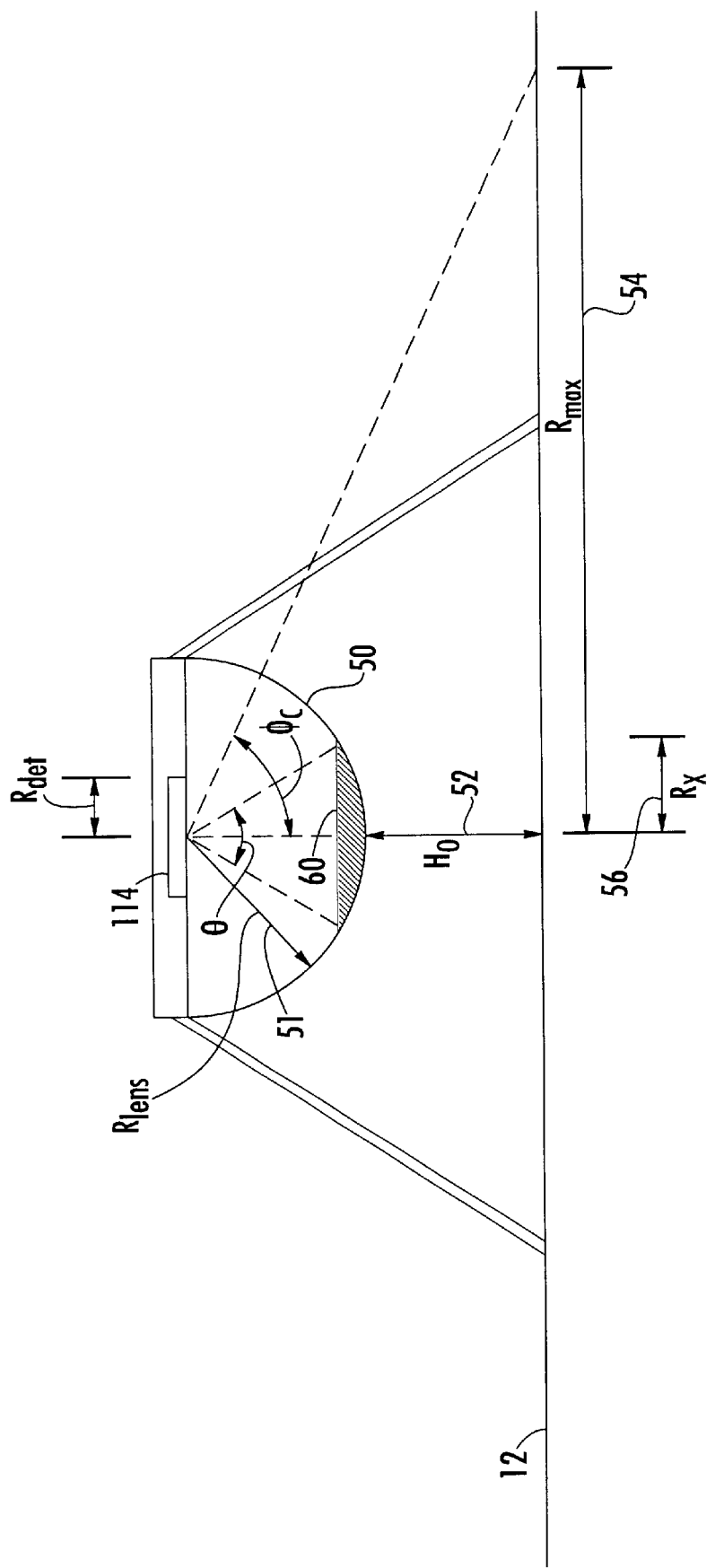
FIG. 3 is a side plan view of the reflected radiance sensor of FIG. 2.

Accordingly, radiation that reflects off surface 12 within detection region 20 and that is incident the detector element 14 will be detected if the radiation is within the wavelength band of interest of the detector element 14. As previously stated, the radiation detected by the detector element 14 comprises reflected radiation only, and does not include a direct incident component of radiation. This is achieved, to a large extent, by positioning the detector element 14 so as to be substantially parallel with surface 12. However, if a lens is used, the lens and the method of attaching it to the detector or detector package must be designed to prevent radiation directly incident on the lens from being defracted by the lens onto the detector. With reference to FIGS. 2 and 3, a second embodiment of a reflected radiance sensor 110 is illustrated. A surface luminance sensor 110 is substantially similar to surface radiance sensor 10 described above in conjunction with FIG. 1, with the exception that the reflected radiance sensor 110 includes a lens 50. The lens 50 is preferably attached to the detector element 114 with optical adhesive so that there is no air gap between the detector and the lens. By definition, where there is no air gap between the detector element 114 and the lens 50, the detector is an optically immersed detector. Optical immersion efficiently couples the radiation to the detector by minimizing Fresnel reflections at the lens-air and air-detector interfaces, and thereby increases the photo-signal. Therefore, optically immersed detectors are often preferred in situations where the photo-signal may otherwise be too weak. However, it is noted that an optically immersed detector is not necessary for the present invention. Further, it is noted that various adhesives can be utilized to optically couple the lens 50 to the detector element 114, such as optical adhesives discussed above. However, it is preferred that the optical adhesive have an index of refraction matched to that of the convex lens 50 in order to reduce loss and limit absorption. For the same reasons, it is also desirable to keep the layer of adhesive as thin as possible.

The material comprising the lens 50 should be transparent to the wavelength band to which the detector element 114 is sensitive, and further, should preferably have an index of refraction that is greater than 1.25 for efficient coupling of radiation between the lens and the detector. Suitable materials for application in the visible to near-infrared wavelengths include Lucite (an acrylic plastic), clear polycarbonate plastic, sapphire and various types of clear glass such as quartz, silica, and crown glass. In addition, it is noted that the lens 50 may be hemispherical, quasi-hemispherical, aspherical, cylindrical or any other suitable shape, a few of which are discussed below as illustrative embodiments.

The lens 50 provides for more efficient operation of the reflected radiance sensor 110 by increasing the field of view, and thus, the detection region 120. In particular, assuming the lens 50 is hemispherical, the field of view is determined by the total internal reflection (TIR) where the radiation incident to the adhesive layer from within the lens is totally internally reflected along the lens-adhesive interface. The critical angle for TIR can be determined utilizing Equation (1) below:

$$TIR=\phi_c=sin^{-1}(n_3/n_2) \tag{1}$$

where $n_2$ is the index of refraction of the lens 50 and $n_3$ is the index of refraction of the adhesive. The field of view (FOV) can be determined utilizing Equation (2) below:

$$FOV=2\phi_c \tag{2}$$

The maximum radius 54 (denoted by $R_{max}$) of the detection region 120 is determined by the field of view (i.e., $\phi_c$) the radius 51 of the lens 50 (denoted by $R_{lens}$) and the distance 52 between the apex of the lens 50 and the surface 12 (denoted $H_O$). Specifically, the maximum radius of the detection region 120 can be determined utilizing Equation (3) below:

$$R_{max}=(R_{lens}+H_0)\tan(\phi_c) \tag{3}$$

However, the detection region 120 is actually an annular ring formed by the maximum radius 54 and an inner radius 56 (denoted by $R_x$), which has been shaded in FIG. 2 for purposes of illustration. The annular ring defines a blind spot 58 from which the detector element 114 will not receive reflected radiation because of black mask 60. In particular, the inner radius is defined by the black mask 60, which is located at the apex of lens 50, as shown.

The black mask 60 is provided to prevent direct incident radiation from being gathered by lens 50. The black mask 60 may be painted on the convex lens 50 utilizing a radiation absorbing paint, or alternatively, a portion of the lens 50 at the apex 62 may be removed, in which case the resulting flat region may be painted with radiation absorbing paint. The radiation absorbing paint utilized is preferably absorbent in the wavelength range of sensitivity of the radiation detector (s) utilized. The inner radius $R_x$ can be determined utilizing Equation (4) below:

$$R_x=R_{lens}\sin(\theta/2) \tag{4}$$

where $\theta$ is the angle subtended by the black mask. Further, note that the radius $R_{det}$ of the detector element 114 should be selected so that horizontal light incident on the lens 50 at the top edge of the black mask 60 just misses the peripheral edge of the detector element 114 after refraction. Thus, the black mask 60 and the diameter of the detector element 114 operate in conjunction with one another to ensure that the detector element 114 does not detect direct incident radiation, but only reflected radiation.

Figure 4:
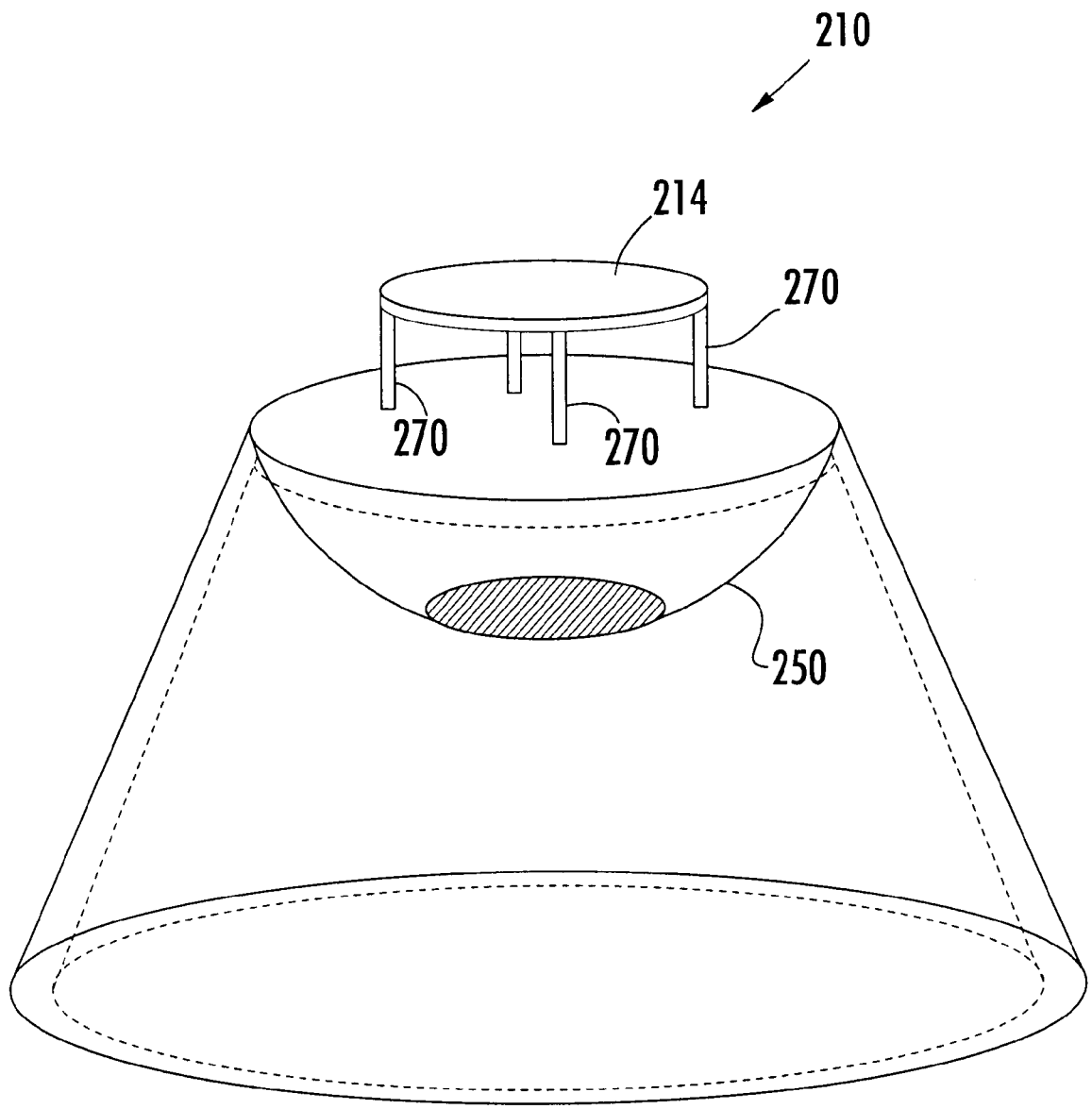
FIG. 4 is a perspective view of a reflected radiance sensor in accordance with a third embodiment of the present invention wherein the detector is positioned substantially at the focal point of the associated lens.

With reference to FIG. 4, a reflected radiance sensor 210 in accordance with a third embodiment of the present invention is illustrated. The reflected radiance sensor 210 is substantially similar to the reflected radiance sensor 110 illustrated in FIGS. 2 and 3, with the exception that a detector element 214 is positioned at or near the focal point of lens 250. The detector element 214 is supported by a plurality of posts 270 which may be microfabricated in conjunction with detector element 214, and then attached to the surface 272 using an adhesive. Alternatively, the detector may be supported by a hallow cylinder with a thin, optically transparent wall, as described below with reference to FIG. 8. By positioning the detector element 214 at or near the focal point of lens 250, a smaller diameter detector element 214 may be utilized, as will be appreciated by those of ordinary skill in the art. Placing the detector at the focal point of the lens allows smaller, less expensive detectors to be used and ensures that all radiation collected by the lens strikes the detector. However, the additional height added to the reflected radiance sensor 210 in order to position the detector element 214 at a focal point may be disadvantageous in certain designs in which it is desirable for the surface luminance detector 210 to have a pseudo-conformal or low profile.

Figure 5:
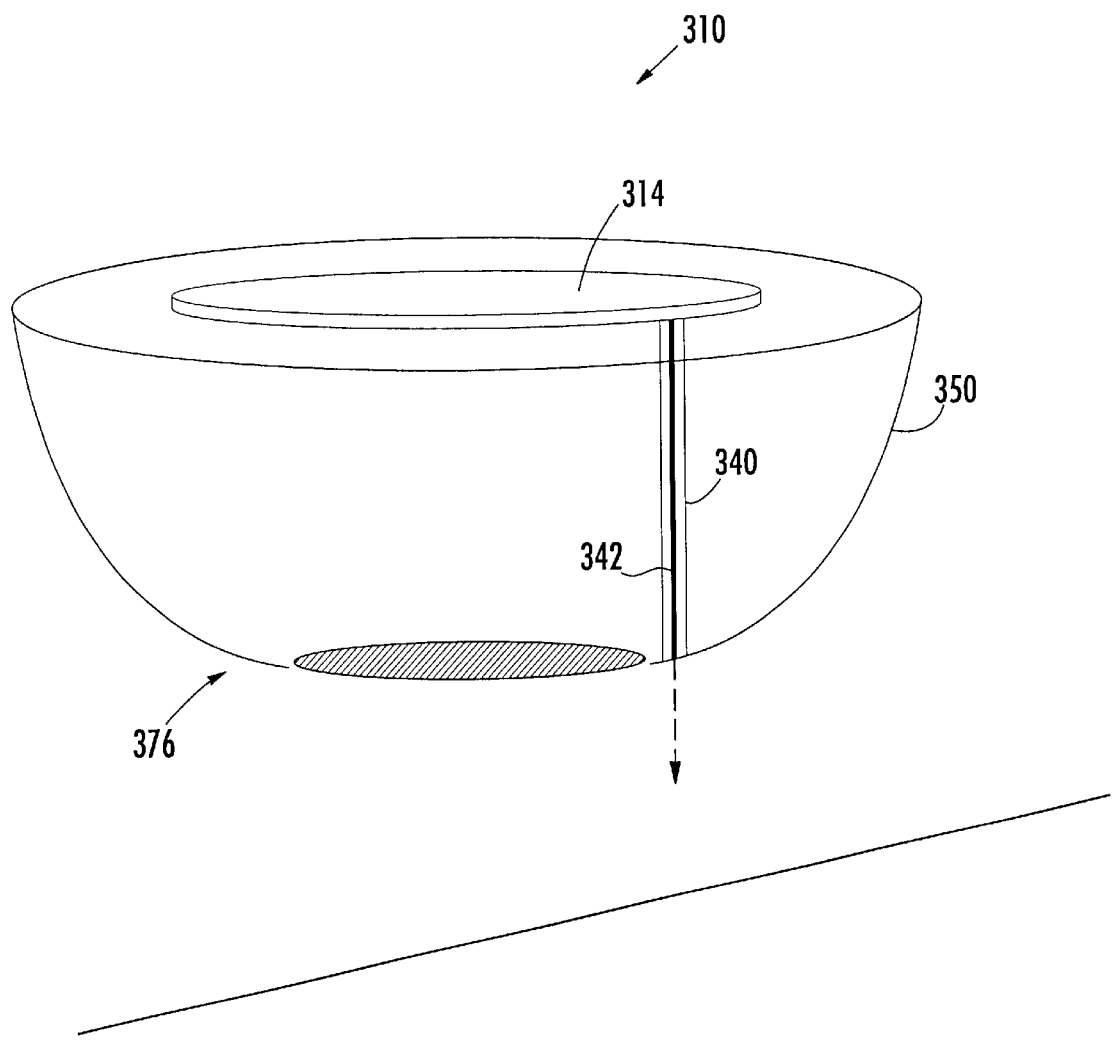
FIG. 5 is a perspective view of a reflected radiance sensor in accordance with a fourth embodiment of the present invention wherein the detector is coupled to a lens that is mounted directly to the reflecting surface.

With reference to FIG. 5, a reflected radiance sensor 310 in accordance with a fourth embodiment of the present invention is illustrated. The reflected radiance sensor 310 is different from the previous embodiments in that the lens 350 serves as the support structure for a detector element 314. The apex of the lens 350 has been removed to form a flat surface 376, which is preferably painted black to absorb any direct radiation refracted onto the lens 350. The lens 350 is attached to the surface 12 at the flat surface 376. The lens 350 can be attached to the surface 12 using various means such as an adhesive or other bonding material or device. An epoxy would provide a strong, durable bond. Accordingly, by removing the apex of the lens 350, no direct incident radiation is detected by a detector element 314 of the correct diameter. A channel 340 may be provided for the passage of leads 342 to external circuitry necessary for the operation of detector element 314. It is noted that the circuitry may be beneath the surface 12. Thus, a channel 340 directly to the surface 12 may be desirable. Thus, as illustrated in FIG. 5, the channel 340 may comprise a bore of sufficient diameter through lens 350 for receiving leads 342 associated with the detector element 314.

Figure 6:
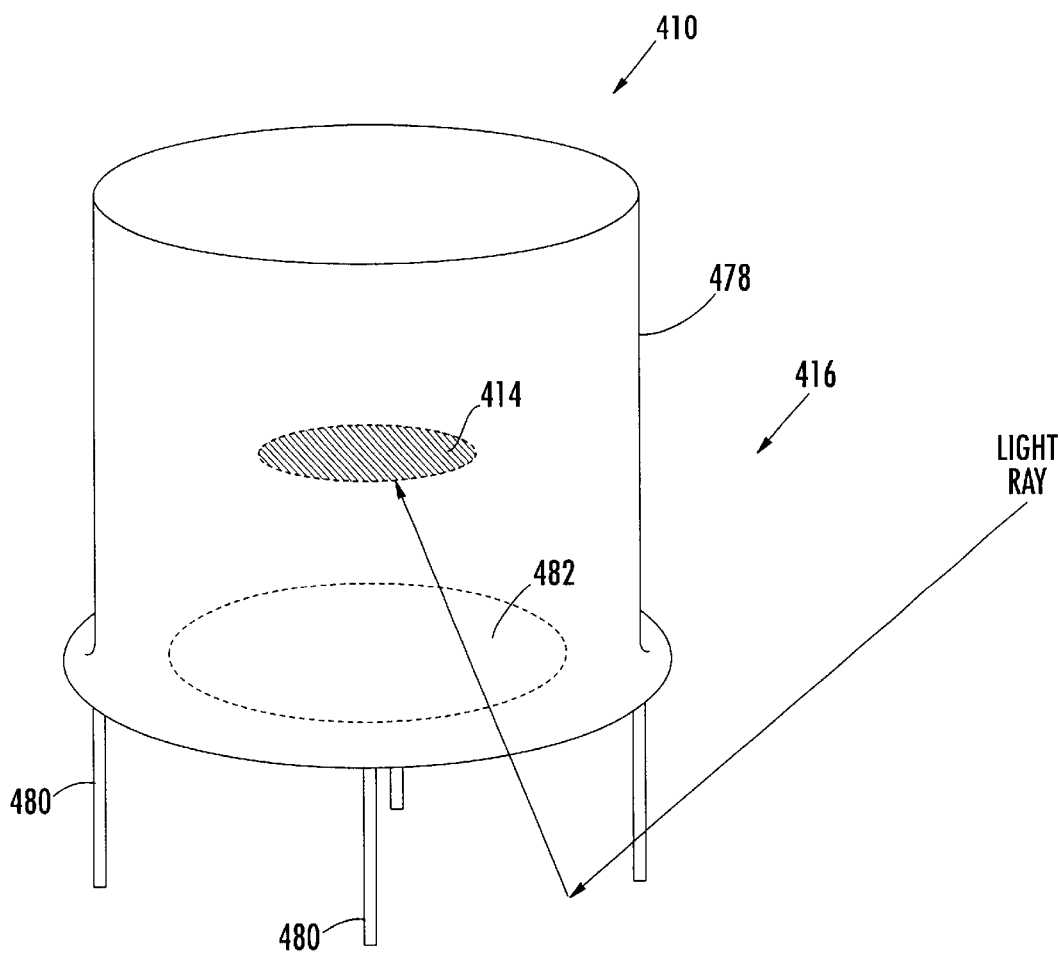
FIG. 6 is a perspective view of a reflected radiance sensor in accordance with a fifth embodiment of the present invention wherein the detector is encapsulated in a metal package.

With reference to FIG. 6, a reflected radiance sensor 410 in accordance with a fifth embodiment of the present invention is illustrated. The reflected radiance sensor 410, the support structure 416 comprises a metal package 478, such as a TO-5 or TO-8 metal package, and support post 480 which attach the metal package 478 to the surface in a spaced-apart relationship. This allows radiation reflecting off the surface to enter the metal package through window 482 (shown in phantom lines), while preventing direct incident radiation form entering the metal package. The metal package 478 includes an internally disposed detector element 414 (shown in phantom lines) which detects reflected radiation received through the window 482. The window 482 preferably includes an anti-reflection coating, and/or may have certain filtering characteristics. It is noted that metal packages often include an aperture plate for defining the field of view of the detector element 414, though in the absence of an aperture plate, the window serves as the aperture and defines the field of view.

It is noted that a lens (not shown) may be attached to the metal package 478 over the window 482 to increase the efficiency with which radiation is collected and coupled to the detector element 414. As with the previous embodiments described above, an adhesive may be utilized to attach the lens to the metal package.

Figure 7:
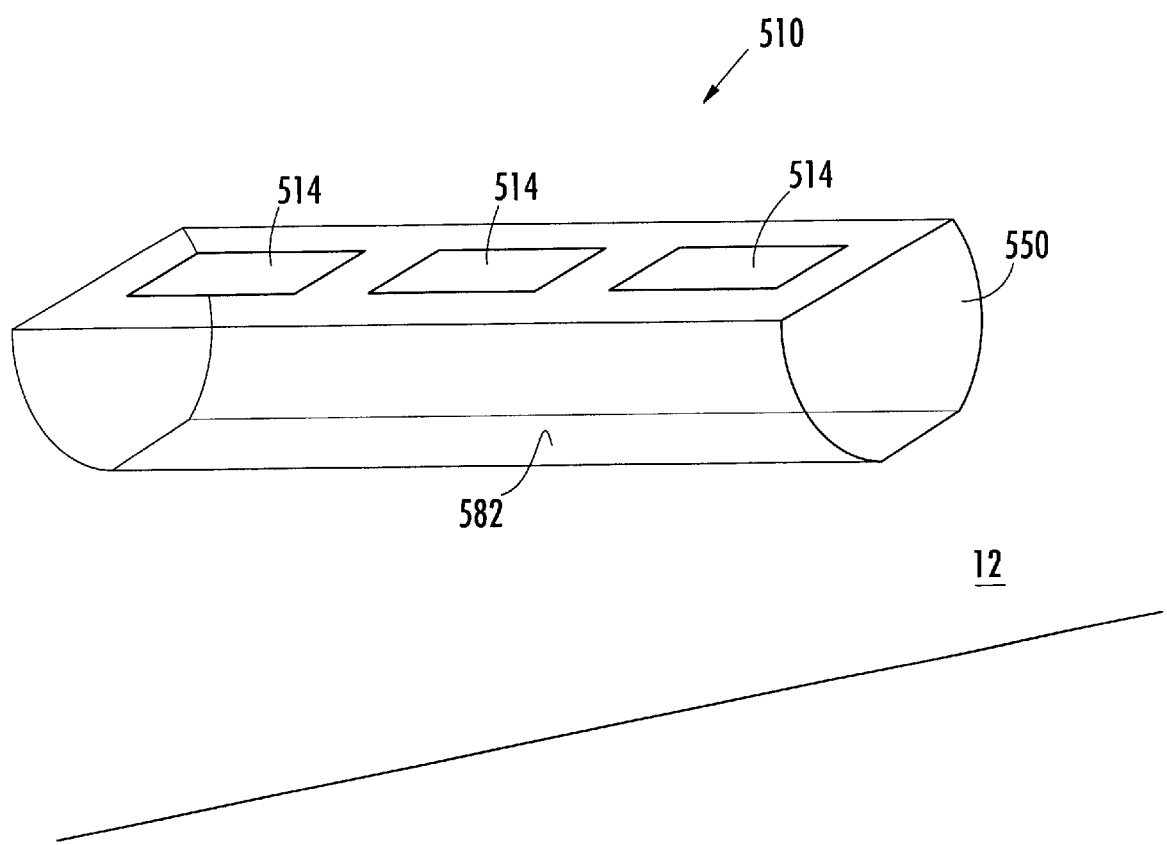
FIG. 7 is a perspective view of a reflected radiance sensor in accordance with a sixth embodiment of the present invention wherein an array of detectors are coupled to a half-cylindrical lens that is mounted directly to the surface.

With reference to FIG. 7, a reflected radiance sensor 510 in accordance with a sixth embodiment of the present invention is illustrated. The reflected radiance sensor 510 includes an array of detector elements 514, which may be sensitive to the same or different wavelength bands. The lens 550 is substantially half-cylindrical. However, since the lens 550 operates as a support structure for detector elements 514, the apex of the lens has been removed forming a flat surface 582 which is bonded to the surface 12. It is preferred that the flat surface 582 of the lens 550 be painted black in order to absorb and direct radiation refracted onto it.

Figure 8:
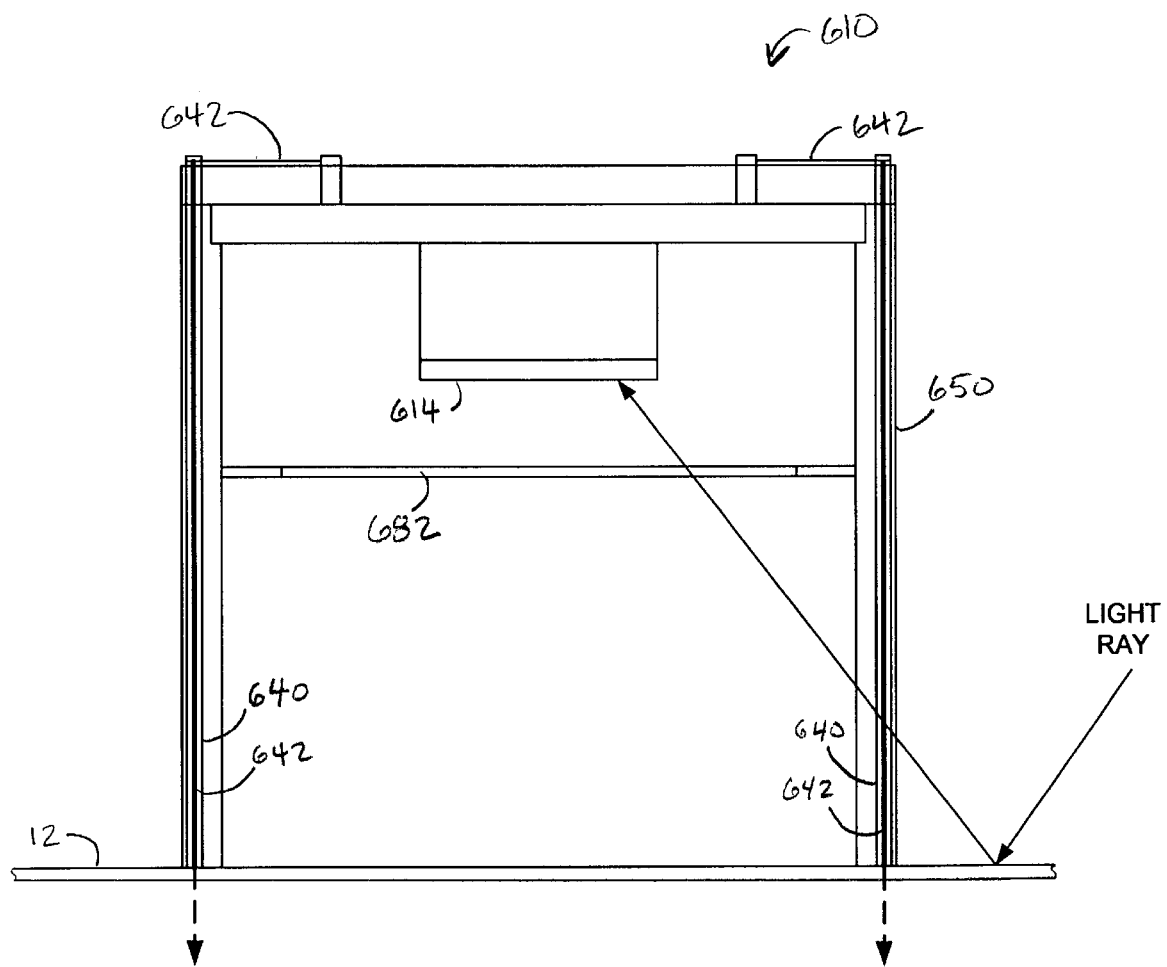
FIG. 8 is a cross-sectional view of a reflected radiance sensor in accordance with a seventh embodiment of the present invention wherein a detector is supported by an upright, hollow, cylindrical support lens that is mounted to the surface.

With reference to FIG. 8, a reflected radiance sensor 610 in accordance with a seventh embodiment of the present invention is illustrated. The reflected radiance sensor 610 comprises a thin walled, hollow cylindrical structure 650 that supports the detector element 614. The support structure 650 is preferably attached to the surface 12 so that its longitudinal axis is substantially perpendicular to the surface 12. The support structure 650 is attached to the surface 12 at an end opposite the end to which the detector element 614 is attached, as shown. A window 682 may be provided to protect detector element 614. If desired, a lens may be attached to window 682, or directly to detector element 614. A channel 640 is provided for receiving leads 642 associate with the detector element. The leads may be symmetrically distributed on the circumference of the support structure. Preferably, the channel 640 comprises a groove machined in the outer surface or inner surface of support structure 650 for housing the leads 642 which may be connected to control/signal circuitry. The advantages of this embodiment is its simplicity and ease by which a convex lens can be added in close proximity to the detector in order to improve its performance. It is noted that hollow, transparent acrylic and polycarbonate plastic cylinders of various diameters are commercially available.

III. Operation

While several methods have been used to empirically demonstrate that one or more of the reflected radiance sensors described above responded to light reflected off a surface which it views, the following discussion of one such illustrative method is provided. In the illustrative method, reflected radiance sensors such as that illustrated in FIGS. 2 and 3 was constructed utilizing a Hamamatsu S2386-8K silicon photodiode and a Lucite® (a registered trademark of E.I. DuPont De Nemours and Company) lens having a 0.60 inch diameter a 0.25 inch thickness. Following removal of the "metal can" part of the metal package and its attached glass window, the Lucite® lens was attached to the photodiode using a single part epoxy having an index of refraction of 1.388. Thus, the silicon photodiode was "immersed" in the lens.

Initially, the reflected radiance sensor was placed on a sheet of flat white paper and a flashlight beam that was directed at the paper at various angles such that the beam was visibly reflected onto the reflected radiance sensor at angle ranging from steep (relative to a line perpendicular to the paper) to grazing angles. Except for the vertically steep and nearly horizontal beams, the detector responded as expected. The magnitude of the photo-response varied with the reflection angle as expected. The same experiment was repeated with a red laser beam from a laser diode pointing device, which produced the same results. Next, the flat white paper was replaced with flat black paper having an approximately 5% reflectivity, which produced a greater than 80% decrease in the photo-signal when either the flashlight beam or red laser beam were applied as compared to the flat white paper.

Figure 9:
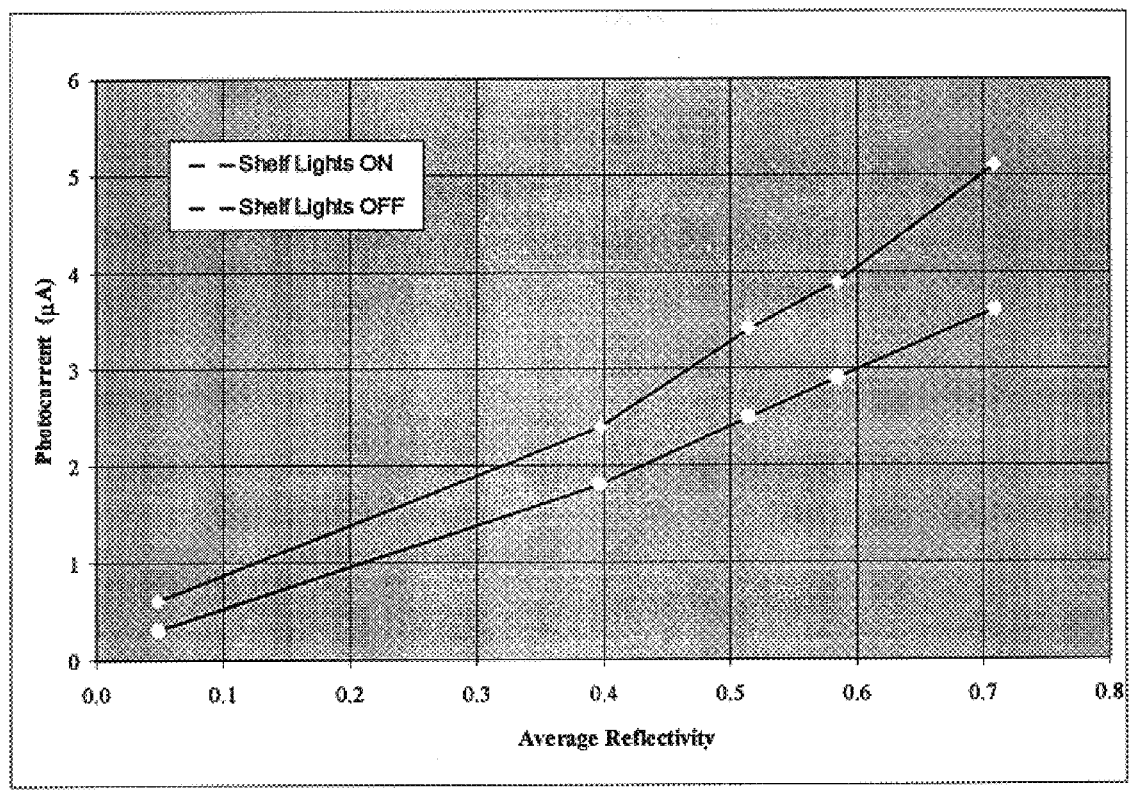
FIG. 9 is a graphical illustration of the photo-response of a reflected radiance sensor in accordance with one embodiment of the present invention when used with surfaces of different reflectivity.

Further quantitative measures were taken using different papers of having colors that ranged from flat white to flat black. The average reflectivity of the paper in the 400–700 nm wavelength range was measured with a Minolta CM 508D reflectometer, the results of which are illustrated in FIG. 9. Note that the photo-signal increased quasi-linearly with increasing reflectivity, as expected. The deviation from linearity is probably due to the fact that no corrections were made for the spectral distribution of the fluorescent light source in the room where the experiments took place, nor for the detector's spectral photo-response curve.

Figure 10:
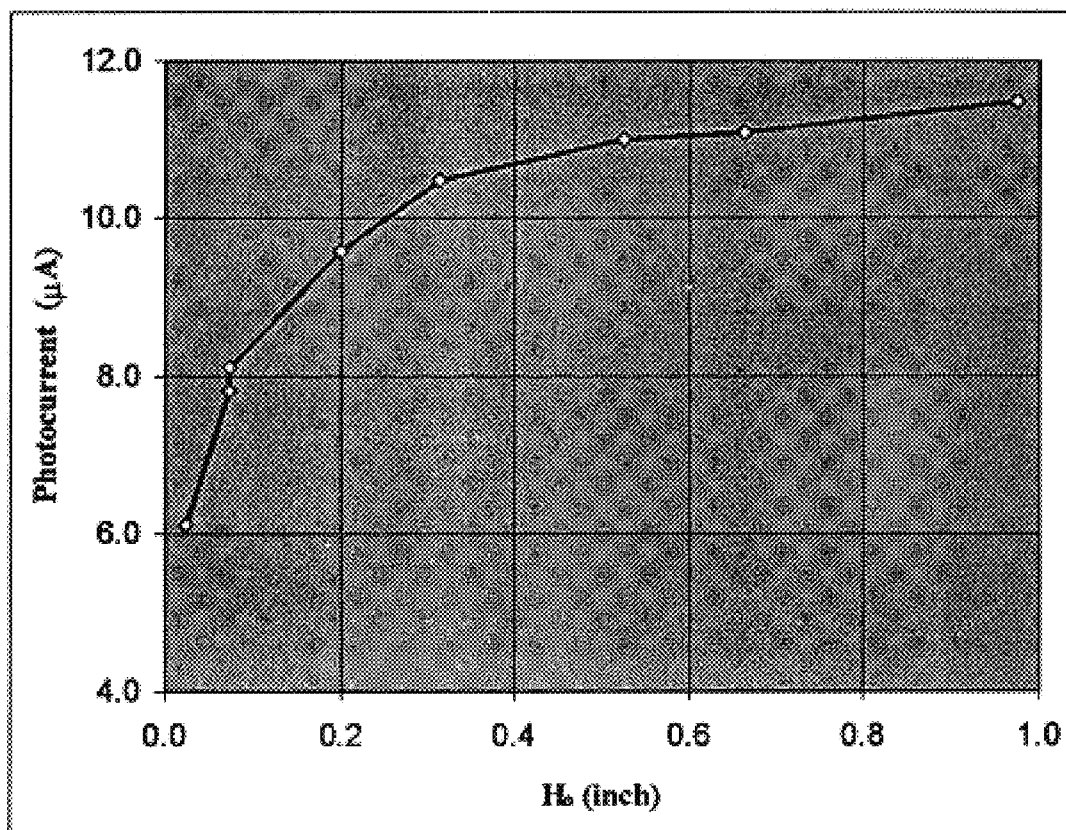
FIG. 10 is a graphical illustration of the photo-response response of a reflected radiance sensor in accordance with one embodiment of the present invention in relation to changes in the distance between the apex of the lens and the surface.
Figure 11:
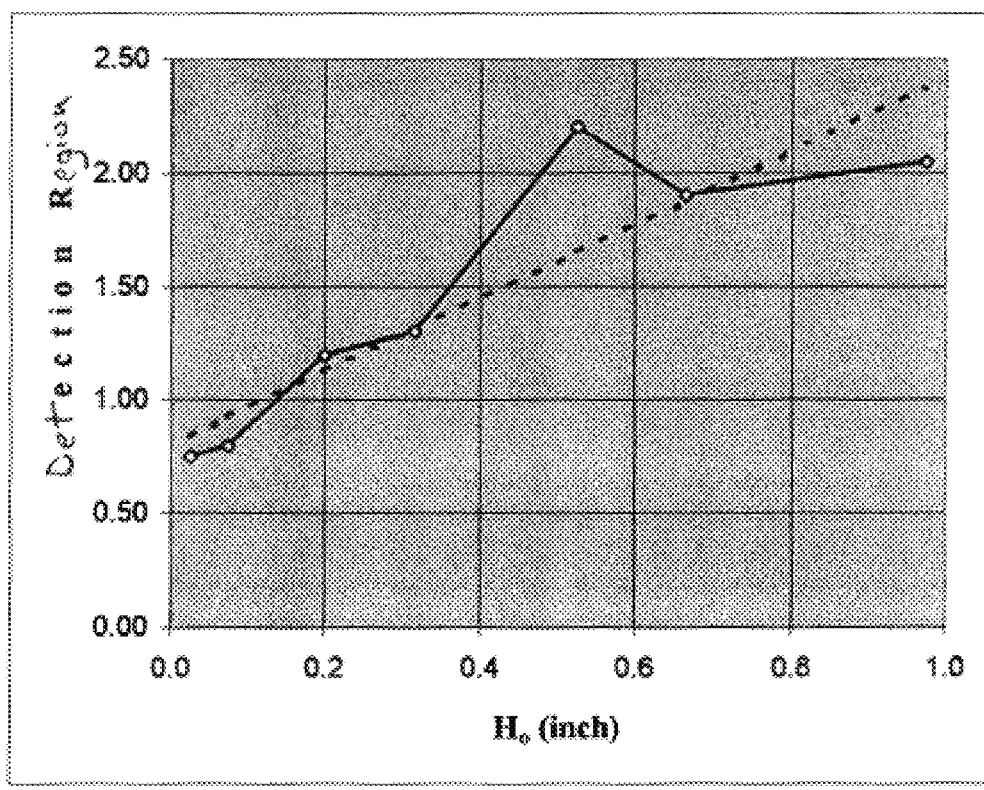
FIG. 11 is a graphical illustration of the detection region of a reflected radiance sensor in accordance with one embodiment of the present invention in relation to changes in the distance between the lens and the surface.

Further experimentation was conducted to determine the effect of increasing the distance 52 (denoted $H_0$ in FIG. 3) of the apex of the lens from the surface that it views. It was confirmed experimentally that the photo-current increased with increasing separation from the surface, as depicted in FIG. 10. The increase in photo-current was conclusively demonstrated to be caused by the increase in the radius of the detection region of the sensor as the distance 52 was increased, as depicted in FIG. 11.

Thus, a reflected radiance sensor in accordance with the present invention can measure the reflected radiance (luminance) off the surface to which the sensor is mounted. Advantageously, only the reflected radiance is detected by the reflected radiance sensor so that the measurements are accurate and consistent. The design of the support structure is flexible, and can be customized to the application of the sensor, the radiation detector utilized, the lens utilized, etc. for optimized performance. The reflected radiance sensor of the present invention is well suited for precisely measuring the intensity (luminance) reflected off of surfaces in lighting systems used in a factory, office, aircraft, etc.

In the drawings and specification, there have been disclosed typical preferred embodiments of the invention, and although specific terms are employed, they are used in a generic and descriptive sense only, and not for the purposes of limitation; the scope of the invention being set forth in the following claims.

Wherefore, the following is claimed:

1. A reflected radiance sensor that measures the radiance of radiation reflected off a surface, comprising:
    a radiation detector;
    a support structure for positioning said radiation detector in a space-apart relationship with respect to said surface so that a field of view of said radiation detector intersects said surface, said support structure substantially transparent to a wavelength band detectable by said radiation detector; and
    wherein said radiation detector measures said radiance of radiation reflected off said surface without measuring directly incident radiation on said radiation detector.

2. The reflected radiance sensor of claim 1, wherein said support structure is frusto-conical in shape.

3. The reflected radiance sensor of claim 1, further comprising a lens optically coupled to said radiation detector.

4. The reflected radiance sensor of claim 3, wherein said support structure includes a cavity, and wherein said lens is disposed in said cavity.

5. The reflected radiance sensor of claim 3, wherein said lens comprises an immersion lens.

6. The reflected radiance sensor of claim 3, wherein said lens is of a shape selected from the group consisting of hemispherical, aspherical, and half-cylindrical.

7. The reflected radiance sensor of claim 3, wherein said lens comprises a material having an index of refractive greater than 1.25.

8. The reflected radiance sensor of claim 3, wherein said radiation detector has a detection region on said surface, and wherein said lens is configured to prevent radiation being directly incident on said radiation detector.

9. The reflected radiance sensor of claim 3, wherein said lens includes a focal point, and wherein said radiation detector is positioned at said focal point of said lens.

10. The reflected radiance sensor of claim 1, wherein said radiation detector is disposed in a position that substantially prevents direct incident radiation on said radiation detector from being detected by said radiation detector.

11. The reflected radiance sensor of claim 1, further comprising two or more radiation detectors attached to said support structure.

12. The reflected radiance sensor of claim 1, wherein said radiation detector is selected from a group consisting of a photodiode, a photo-voltaic detector, a photo-conductor, a thermistor (photoresistor), a thermopile, a bolometer, a micro-bolometer, a pyroelectic detector, a metal-insulator-semiconductor (MIS) detector, a charge injection device (CID) detector, platinum silicide and iridium silicide Schottky diode infrared detectors, a Schottky diode detector, a transparent-electrode Schottky diode detector, a millimeter-wave detector, a microwave detector, and a charge coupled device (CCD).

13. The reflected radiance sensor of claim 1, wherein said support structure comprises a lens optically coupled to said radiation detector.

14. The reflected radiance sensor of claim 1, wherein said support structure comprises Lucite.

15. The reflected radiance sensor of claim 1, wherein said radiation detector is encased in a metal package having a window for receiving radiation therethough.

16. The reflected radiance sensor of claim 1, wherein said support structure includes a channel for receiving electrical leads associated with said radiation detector.

17. A reflected radiance sensor that measures the radiance of radiation reflected off a surface, comprising:
    a radiation detector;
    a support structure for positioning said radiation detector in a space-apart relationship with respect to said surface so that a field of view of said radiation detector intersects said surface, wherein said radiation detector measures said radiance of radiation reflected off said surface without measuring directly incident radiation on said radiation detector;
    a lens optically coupled to said radiation detector, wherein said lens includes an apex, and wherein said apex includes a black mask that absorbs radiation incident on it.

18. A reflected radiance sensor that measures the radiance of radiation reflected off a surface, comprising:
    a radiation detector;
    a support structure for positioning said radiation detector in a space-apart relationship with respect to said surface so that a field of view of said radiation detector intersects said surface, wherein said radiation detector measures said radiance of radiation reflected off said surface without measuring directly incident radiation on said radiation detector;
    a lens optically coupled to said radiation detector, wherein said lens includes a black mask for preventing radiation being directly incident on said radiation detector.

19. A reflected radiance sensor that measures the radiance of radiation reflected off a surface, comprising:
    a radiation detector;
    a support structure for positioning said radiation detector in a space-apart relationship with respect to said surface so that a field of view of said radiation detector intersects said surface, wherein said radiation detector measures said radiance of radiation reflected off said surface without measuring directly incident radiation on said radiation detector;

a lens optically coupled to said radiation detector, wherein said lens includes a planar surface opposite said radiation detector for preventing radiation being directly incident on said radiation detector.

20. A reflected radiance sensor that measures the reflectivity of a surface, comprising:

a calibrated radiation detector;

a lens optically coupled to said radiation detector, wherein said lens is mounted to said surface, wherein said lens positions said radiation detector in a space-apart relationship with respect to said surface so that a field of view of said radiation detector intersects said surface; and wherein said calibrated radiation detector measures radiation reflected off said surface without measuring directly incident radiation on said radiation detector.

21. The reflected radiance sensor of claim 20, wherein radiation is coupled into said detector at a precisely known efficiency.

* * * * *